(12) United States Patent
Shaffer et al.

(10) Patent No.: US 8,937,886 B2
(45) Date of Patent: Jan. 20, 2015

(54) DYNAMIC REROUTE SCHEDULING IN A DIRECTED ACYCLIC GRAPH (DAG)

(75) Inventors: Shmuel Shaffer, Palo Alto, CA (US); Jean-Philippe Vasseur, Saint Martin d'Uriage (FR); Sandeep Jay Shetty, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 530 days.

(21) Appl. No.: 12/971,474

(22) Filed: Dec. 17, 2010

(65) Prior Publication Data

US 2012/0155329 A1 Jun. 21, 2012

(51) Int. Cl.
*H04L 12/28* (2006.01)
*H04L 12/757* (2013.01)

(52) U.S. Cl.
CPC .................................. *H04L 45/023* (2013.01)
USPC ......................................................... 370/255

(58) Field of Classification Search
CPC .............................. H04L 12/26; H04L 45/023
USPC ......................................... 370/255, 390, 400
See application file for complete search history.

(56) References Cited

U.S. PATENT DOCUMENTS

| | | | |
|---|---|---|---|
| 6,876,668 B1 | 4/2005 | Chawla et al. | |
| 7,006,431 B1 | 2/2006 | Kanekar et al. | |
| 7,162,034 B1 | 1/2007 | Joly et al. | |
| 7,401,159 B1 | 7/2008 | Aviani et al. | |
| 7,466,655 B1 | 12/2008 | Zhao | |
| 7,558,214 B2 | 7/2009 | Previdi et al. | |
| 7,710,882 B1 | 5/2010 | Previdi et al. | |
| 8,270,313 B2 * | 9/2012 | Tao et al. | 370/252 |
| 2006/0091999 A1 | 5/2006 | Howarth | |
| 2010/0250723 A1 | 9/2010 | Kamei | |

FOREIGN PATENT DOCUMENTS

WO   WO-2005039109 A1   4/2005

OTHER PUBLICATIONS

Gnawali, et al., "The Minimum Rank Objective Function with Hysteresis", IETF Network Working Group, Internet-Draft draft-gnawali-roll-minrank-hysteresis-of-Jul. 1, 2010, 8 pages.

(Continued)

*Primary Examiner* — Man Phan
*Assistant Examiner* — Nourali Mansoury
(74) *Attorney, Agent, or Firm* — Edwards Wildman Palmer LLP; James M. Behmke; Carolina E. Save

(57) ABSTRACT

In one embodiment, a particular node joins a directed acyclic graph (DAG) in a computer network at a parent node, and determines its grade based on a topology of the DAG, the grade lower than the parent node and higher than any child nodes of the particular node. In response to detecting a trigger for a routing change in the DAG, the particular node delays the routing change based on the grade such that the delay is longer than a first associated delay of any of the child nodes and shorter than a second associated delay of the parent node. Upon expiration of the delay, the particular node may determine if the trigger for the routing change is still valid, and if valid, performs the routing change.

24 Claims, 17 Drawing Sheets

(56) References Cited

OTHER PUBLICATIONS

Schur, "Notification of Transmittal of the International Search Report and Written Opinion of the International Searching Authority, or the Declaration", Patent Cooperation Treaty, International Searching Authority, International Application No.: PCT/US2011/065414, International Filing Date: Dec. 16, 2011, mailed Mar. 2, 2012, 12 pages.

Thubert, "RPL Objective Function 0,", <draft-ietf-roll-of0-03>, Jul. 29, 2010 version.

Vasseur et al., "Routing Metrics Used for Path Calculation in Low Power and Lossy Networks," <draft-ietf-roll-routing-metrics-12>, Nov. 10, 2010 version.

Winter et al., "RPL: IPv6 Routing Protocol for Low Power and Lossy Networks," <draft-ietf-roll-rpl-15>, Nov. 11, 2010 version.

Bai, et al. "Notification Concerning Transmittal of Copy of International Preliminary Report on Patentability", Patent Cooperation Treaty, International Application No. PCT/US2011/065414, mailed Jun. 27, 2013, 7 pages, The International Bureau of the World Intellectual Property Organization, European Patent Office, Munich, Germany.

* cited by examiner

DYNAMIC REROUTE SCHEDULING IN A DIRECTED ACYCLIC GRAPH (DAG)

TECHNICAL FIELD

The present disclosure relates generally to computer networks, and, more particularly, to directed acyclic graph (DAG) routing and management.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs is DODAG discovery, construction, and maintenance.

Currently, mesh networks, such as LLNs, can take a long time to converge. In addition, existing systems allow parent selection changes (convergence) to take place anywhere within the DAG at each node's individual discretion. Due to these two factors, network oscillations may occur, as well as unnecessary changes during convergence (routing changes). For example, during the convergence period, child nodes may migrate to other parents and therefore change the conditions for their children which may necessitate additional changes in the network. In particular, when a node with a large number of children (and thus a large amount of traffic) changes a parent, many child nodes are affected, likely having a strong impact on path metrics (e.g., and latency), leading to further oscillation. Moreover, the new traffic that the aforementioned node directs via its new parent presents a heavy load to the new parent, and thus the new parent may also need to find an alternate parent as well, resulting in large scale network and traffic rerouting. To top it off, during this convergence process, messages which have been sent downward may traverse via a specific (pre-configured) route which may no longer be valid because the path between the sending node and a root of the DAG may have been reconfigured.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
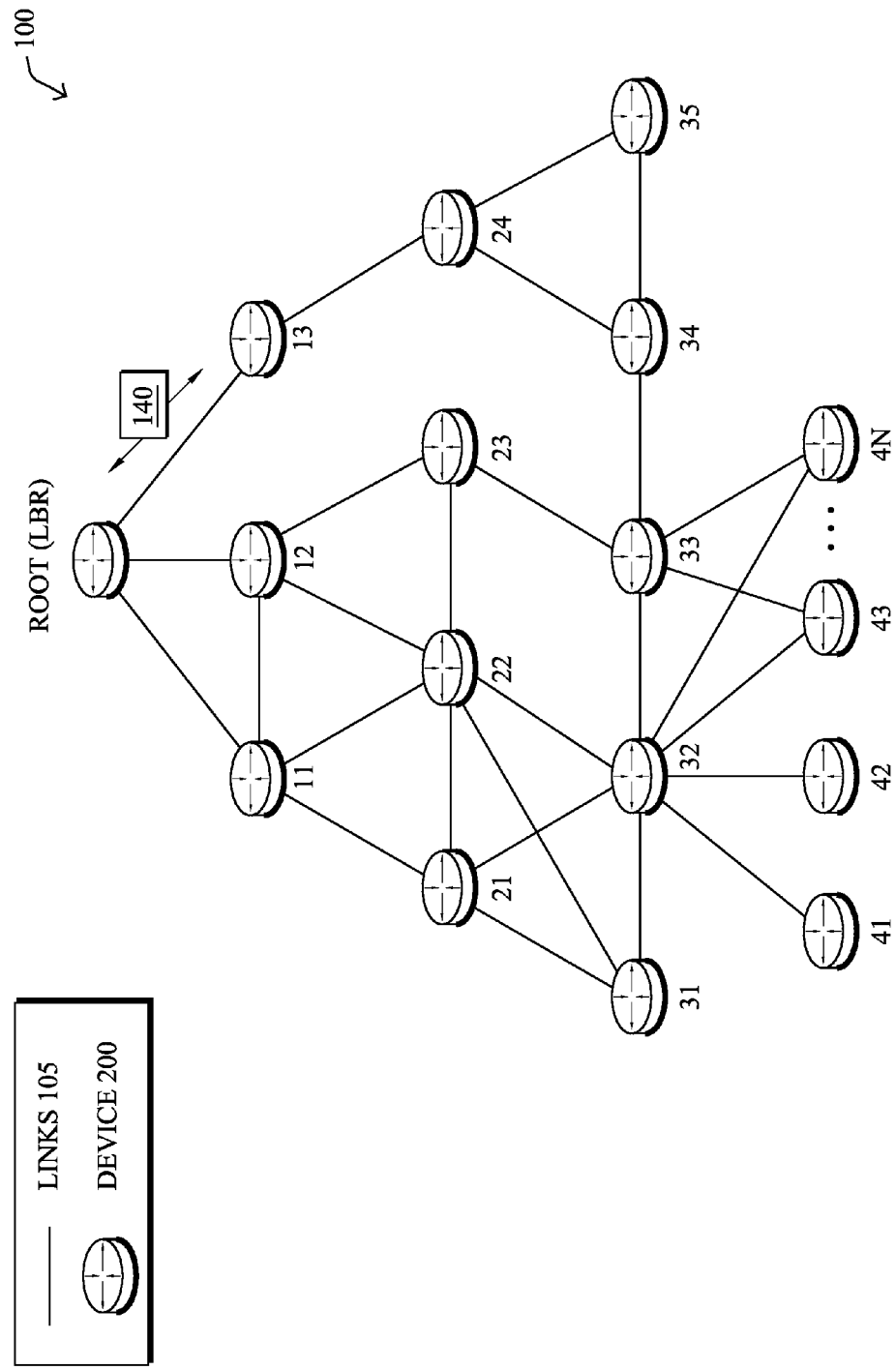
FIG. 1 illustrates an example computer network.

According to one or more embodiments of the disclosure, a particular node joins a directed acyclic graph (DAG) in a computer network at a parent node, and determines its grade based on a topology of the DAG, the grade lower than the parent node and higher than any child nodes of the particular node. In response to detecting a trigger for a routing change in the DAG, the particular node delays the routing change based on its grade such that the delay is longer than a first associated delay of any of the child nodes and shorter than a second associated delay of its parent node. Upon expiration of the delay, the particular node may determine if the trigger for the routing change is still valid, and if valid, performs the routing change. In this manner, routing changes are ordered within a DAG to occur from the leaf nodes up to a root node of the DAG.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, CPL G3, Watt Pulse Communication (WPC), and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically wireless networks, though wired connections are also available. That is, in addition to one or more sensors, each sensor device (node) in a sensor network may generally be equipped with a radio transceiver or other communication port, a microcontroller, and an energy source, such as a battery. Generally, size and cost constraints on sensor nodes result in corresponding constraints on resources such as energy, memory, computational speed and bandwidth. Correspondingly, a reactive routing protocol may, though need not, be used in place of a proactive routing protocol for sensor networks.

In certain configurations, the sensors in a sensor network transmit their data, along with routing/relaying data from other sensors, to one or more centralized or distributed database management nodes that obtain the data for use with one or more associated applications. Alternatively (or in addition), certain sensor networks provide is for mechanisms by which an interested subscriber (e.g., "sink") may specifically request data from devices in the network. In a "push mode," the sensors transmit their data to the sensor sink/subscriber without prompting, e.g., at a regular interval/frequency or in response to external triggers, such as alarm messages. Conversely, in a "pull mode," the sensor sink may specifically request that the sensors (e.g., specific sensors or all sensors) transmit their current data (or take a measurement, and transmit that result) to the sensor sink. (Those skilled in the art will appreciate the benefits and shortcomings of each mode, and both apply to the techniques described herein.)

FIG. 1 is a schematic block diagram of an example computer network 100 illustratively comprising nodes/devices 200 (e.g., labeled as shown, "Root," "11," "12," . . . "43," "4N") interconnected by various methods of communication. For instance, the links 105 may be wired links or may comprise a wireless communication medium, where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, while the embodiments are shown herein with reference to a generally "tree" shaped network, the description herein is not so limited, and may be applied to networks that have branches emitting to all directions from with the root node generally centralized among a plurality of surrounding nodes.

Illustratively, certain devices in the network may be more capable than others, such as those devices having larger memories, sustainable non-battery power supplies, etc., versus those devices having minimal memory, battery power, etc. For instance certain devices 200 may have no or limited memory capability. Also, one or more of the devices 200 may be considered "root nodes/devices" (or root capable devices), also referred to as LLN border routers (LBRs), while one or more of the devices may also be considered "destination nodes/devices."

Data packets 140 (e.g., traffic and/or messages sent between the devices/nodes) may be exchanged among the nodes/devices of the computer network 100 using predefined network communication protocols such as the Transmission Control is Protocol/Internet Protocol (TCP/IP), User Datagram Protocol (UDP), Multi-Protocol Label Switching (MPLS), various proprietary protocols, etc. In this context, a protocol consists of a set of rules defining how the nodes interact with each other. In addition, packets within the network 100 may be transmitted in a different manner depending upon device capabilities, such as source routed packets.

Figure 2:
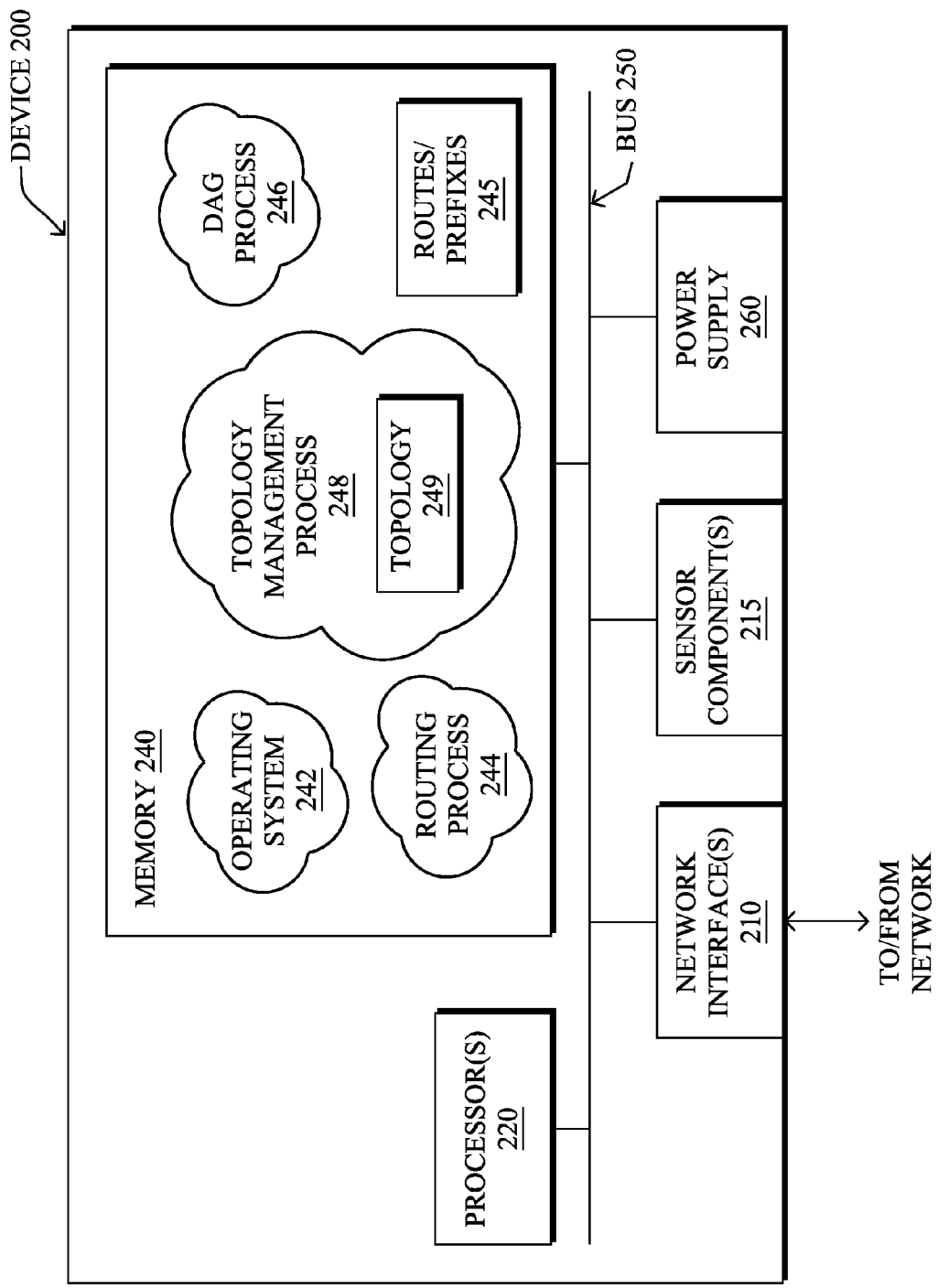
FIG. 2 illustrates an example network device/node.

FIG. 2 is a schematic block diagram of an example node/device 200 that may be used with one or more embodiments described herein, e.g., as a root node or other node (e.g., sensor) in the network. The device may comprise one or more network interfaces 210, one or more sensor components 215 (e.g., sensors, actuators, etc.), at least one processor 220 (e.g., an 8-64 bit microcontroller), and a memory 240 interconnected by a system bus 250, as well as a power supply 260 (e.g., battery, plug-in, etc.). Notably, a root node, as well as other nodes, need not contain a sensor component 215.

The network interface(s) 210 contain the mechanical, electrical, and signaling circuitry for communicating data over physical and/or wireless links coupled to the network 100. The network interfaces may be configured to transmit and/or receive data using a variety of different communication protocols, including, inter alia, TCP/IP, UDP, wireless protocols (e.g., IEEE Std. 802.15.4, WiFi, Bluetooth®), Ethernet, powerline communication (PLC) protocols, etc. Note that the root may have two different types of network connections 210. Namely, one or more interfaces may be used to communicate with the mesh network (into the mesh cell), i.e., the other nodes shown in FIG. 1, while for the root node, another interface may be used as a WAN uplink network interface between the root node and, for example, a head-end device located through the WAN.

The memory 240 comprises a plurality of storage locations that are addressable by the processor 220 and the network interfaces 210 for storing software programs and data structures associated with the embodiments described herein. As noted above, certain devices may have limited memory or no memory (e.g., no memory for storage other than for programs/processes operating on the device). The processor 220 may comprise necessary elements or logic adapted to execute the software programs and manipulate the data structures, such as routes or prefixes 245 (notably on capable devices only). An operating system 242, portions of which are typically resident in memory 240 and executed by the processor, functionally organizes the device by, inter alia, invoking operations in support of software processes and/or services executing on the device. These software processes and/or services may comprise routing process/services 244, which may include an illustrative directed acyclic graph (DAG) process 246. Also, for root devices (or other management devices), a topology management process 248 and associated stored topologies 249 may also be present in memory 240, for use as described herein. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table 245 containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the is less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Internet Draft, entitled "RPL: IPv6 Routing Protocol for Low Power and Lossy is Networks" <draft-ietf-roll-rpl-15> by Winter, at al. (Nov. 11, 2010 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built based on an Objective Function (OF). The role of the Objective Function is generally to specify rules on how to build the DAG (e.g. is number of parents, backup parents, etc.).

In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, estimated transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks" <draft-ietf-roll-routing-metrics-12> by Vasseur, et al. (Nov. 10, 2010 version). Further, an example OF (e.g., a default OF) may be found in an IETF Internet Draft, entitled "RPL Objective Function 0" <draft-ietf-roll-of0-03> by Thubert (Jul. 29, 2010 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. This process helps build routing tables to send downward messages to any node in the DAG and not only to the leafs. Nodes that are capable of maintaining routing state may aggregate routes from DAO messages that they receive before transmitting a DAO message. Nodes that are not capable of maintaining routing state, however, may attach a next-hop parent address. The DAO message is then sent is directly to the DODAG root that can in turn build the topology and locally compute downward routes to all nodes in the DODAG. Such nodes are then reachable using source routing techniques over regions of the DAG that are incapable of storing downward routing state.

Figure 3:
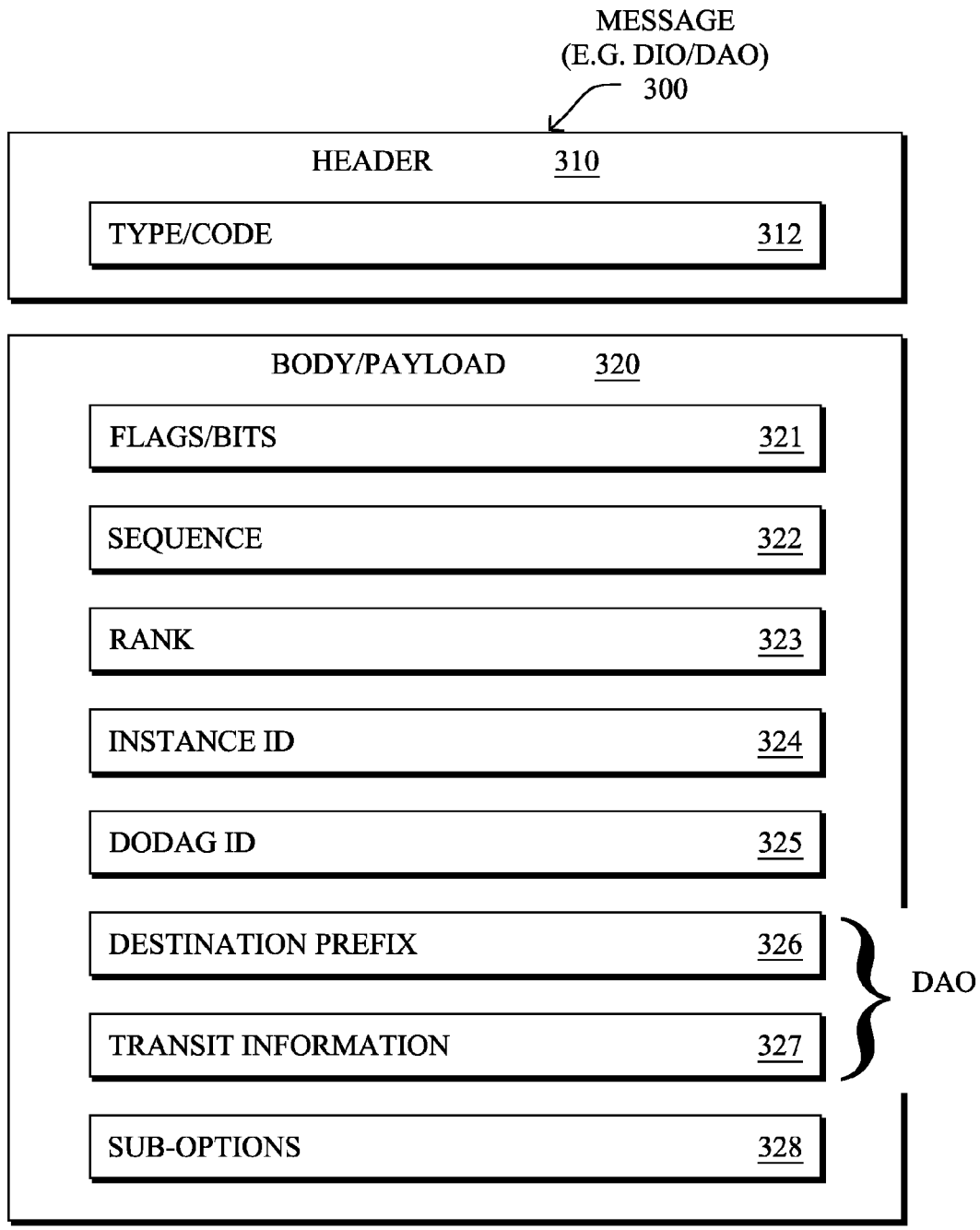
FIG. 3 illustrates an example message.

FIG. 3 illustrates an example simplified control message format 300 that may be used for discovery and route dissemination when building a DAG, e.g., as a DIO or DAO. Message 300 illustratively comprises a header 310 with one or more fields 312 that identify the type of message (e.g., a RPL control message), and a specific code indicating the specific type of message, e.g., a DIO or a DAO (or a DAG Information Solicitation). Within the body/payload 320 of the message may be a plurality of fields used to relay the pertinent information. In particular, the fields may comprise various flags/bits 321, a sequence number 322, a rank value 323, an instance ID 324, a DODAG ID 325, and other fields, each as may be appreciated in more detail by those skilled in the art. Further, for DAO messages, additional fields for destination prefixes 326 and a transit information field 327 may also be included, among others (e.g., DAO_Sequence used for ACKs, etc.). For either DIOs or DAOs, one or more additional sub-option fields 328 may be used to supply additional or custom information within the message 300. For instance, an objective code point (OCP) sub-option field may be used within a DIO to carry codes specifying a particular objective function (OF) to be used for building the associated DAG. Alternatively, sub-option fields may be used to carry other certain information within a message 300, such as indications, requests, capabilities, lists, etc., as may be described herein, e.g., in one or more type-length-value (TLV) fields.

Figure 4:
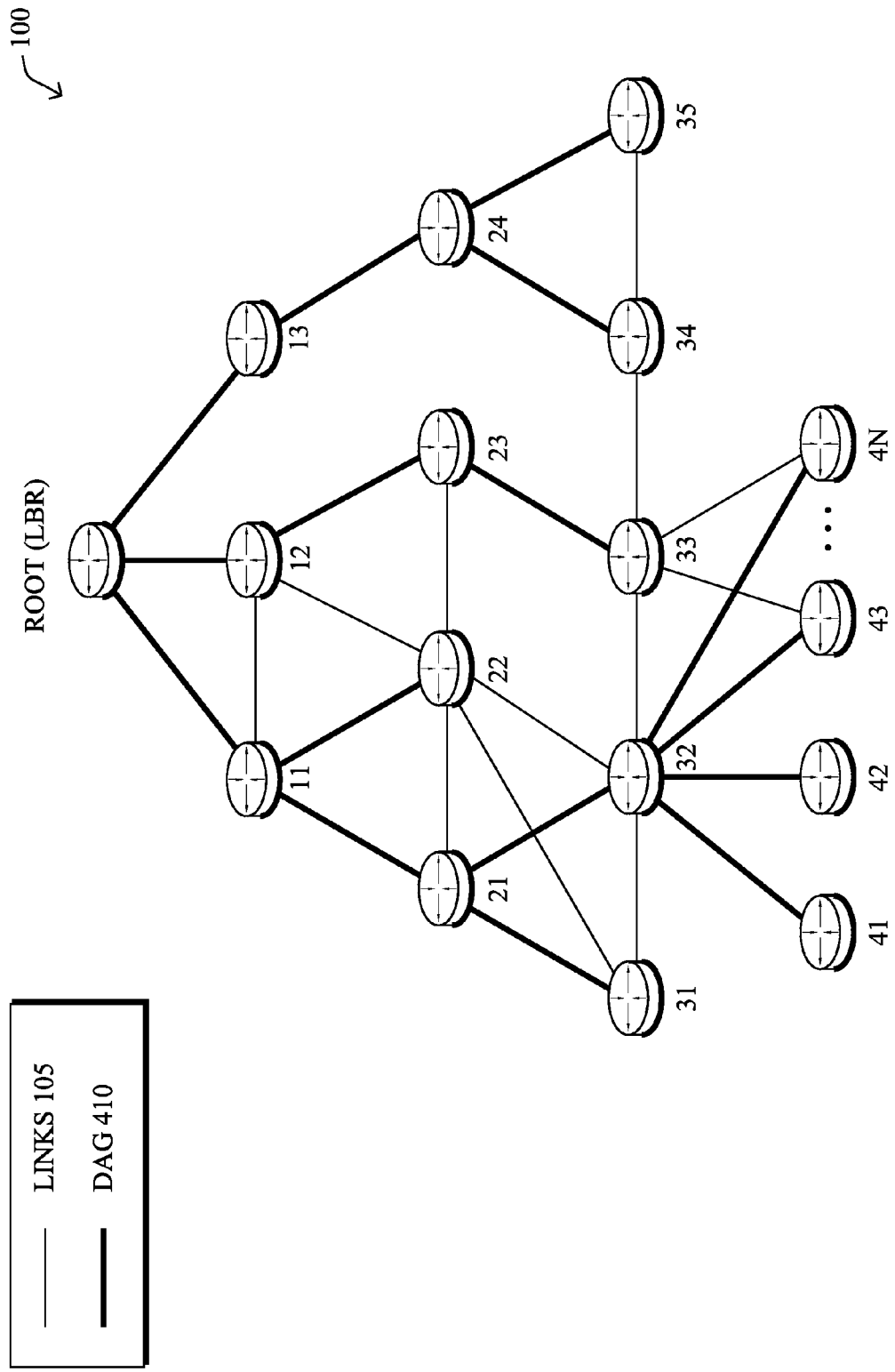
FIG. 4 illustrates an example directed acyclic graph (DAG) in the computer network of FIG. 1.

FIG. 4 illustrates an example DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 410 (shown as thicker lines), which extends from the root node toward one or more leaf nodes (nodes without children). Traffic/packets 140 (shown in FIG. 1) may then traverse the DAG 410 in either the upward direction toward the root or downward toward the leaf nodes.

As noted above, existing systems allow parent selection changes (convergence) to take place anywhere within the DAG at each node's individual discretion. Due to this factor, network oscillations may occur, as well as unnecessary changes during convergence (routing changes). For example, during the convergence period, child nodes may migrate to other parents and therefore change the conditions for their children which may necessitate additional changes in the network. In particular, when a node with a large number of children (and thus a large amount of traffic) changes a parent, many child nodes are affected, likely having a strong impact on path metrics (e.g., and latency), leading to further oscillation. Moreover, the new traffic that the aforementioned node directs via its new parent presents a heavy load to the new parent, and thus the new parent may also need to find an alternate parent as well, resulting in large scale network and traffic rerouting. To top it off, during this convergence process, messages which have been sent downward may traverse via a specific route which may no longer be valid because the path between the sending node and a root of the DAG may have been reconfigured.

As a further illustration, in existing systems each node (regardless of the number of children it has and regardless of its place on the DAG) continuously observes its respective optimization function (OF) and when indicated it optimizes its parent resulting in new routes through the network. For instance, if a given node determines that the ETX of its parent is above a specific threshold it may initiate a route change by homing to a new parent. In existing systems however the fact that the ETX of a specific link increases (indicating a lower quality of service), a node may select a new parent, which may as well be reflected by an increased ETX of the path to the DAG root of its child nodes, and thereafter children of a higher order. (Note that the ETX is an example metric, and that the same logic applies to many other metrics.) As a result while the said node changes its parent, its children may make a similar decision and change their parent (which was the aforementioned node) as well, creating unwanted network oscillations during network changes.

Dynamic Reroute Scheduling

The techniques herein are designed to minimize the number of large route changes (and therefore reduce the number of associated DAG maintenance traffic) during the convergence phase of a mesh network (e.g., network 100/DAG 410), as well as during the ongoing DAG maintenance/optimization phase. In particular, according to the techniques herein, the position of a node within the DAG is taken into account to schedule (order) the routing changes in the DAG. For instance, the techniques herein minimize the route changes by assigning a different timing for the route changes of nodes based on how much effect their changes would have on the rest of the network. That is, changes by nodes with a large number of children (or traffic) may affect the network more than those by nodes which are farther away from the root and as such have fewer children (and less traffic), e.g., closer to leaf nodes. Also, since the techniques dampen the size of traffic flow changes, a decreased number of lost messages may be realized, accordingly.

Specifically, according to one or more embodiments of the disclosure as described in greater detail below, a particular node joins a DAG in a computer network at a parent node, and determines its "grade" based on a topology of the DAG, the grade lower than the parent node and higher than any child nodes of the particular node. For example, in one specific embodiment, the grade of a lead node is set to 0. In response to detecting a trigger for a routing change in the DAG, the particular node delays the routing change based on the grade such that the delay is longer than a first associated delay of any of the child nodes and shorter than a second associated delay of the parent node. Upon expiration of the delay, the particular node may determine if the trigger for the routing change is still valid, and if valid, performs the routing change. In this manner, routing changes are scheduled within a DAG to occur from the leaf nodes up to a root node of the DAG.

Illustratively, the techniques described herein may be performed by hardware, software, and/or firmware, such as in accordance with DAG process 246, which may contain computer executable instructions executed by the processor 220 to perform functions relating to the novel techniques described herein, e.g., in conjunction with routing process 244. For example, the techniques herein may be treated as extensions to conventional protocols, such as the RPL protocol, and as such, would be processed by similar components understood in the art that execute the RPL protocol, accordingly.

Operationally, the techniques herein are based on the observation that the cost to the overall performance caused by changing the route on the periphery of the network is less than the cost of making route changes at the core of the network. The techniques herein, therefore, start routing changes at the edge of the network (leaf nodes) and works upwards towards the root node. In other words, nodes closer to the leaf nodes of a DAG 410 may perform routing changes more frequently than nodes closer to the root node (e.g., having more stringent requirements/delays for making changes), thus minimizing the rerouting at the top of the DAG (or center of a cell) in order to keep the traffic flowing uninterrupted at the core/root of the network where packet traffic is usually heavier and as such more prone to collisions.

A node that has joined a DAG 410 at a parent node may first determine what its "grade" is within the DAG. As defined herein, a "grade" is a ranking or ordering of a node based on the topology of the DAG 410, such that any node in the network has a grade that is lower than the grade of its parent node and higher than the grade of any child nodes of the particular node. Note that the terms "higher" and "lower" are relative to an order from the leaf nodes of a dag (lowest nodes) to the root node (highest node), and are not specific to numerical values being higher or lower. In one embodiment, the grade is received from a management node of the DAG (e.g., the DAG root), though in other embodiments herein, each node of the DAG can determine its own grade in a distributed manner, allowing the techniques to scale for particularly large networks.

A node's DAG grade may be determined based on a variety of topology-based factors. For instance, certain topology factors of the DAG may consist of a number of nodes in a sub-DAG of the particular node (i.e., a number of children, grandchildren, etc.) a "depth" (rank/order) of the particular node within the DAG from a root node, and a "height" in the sub-DAG of the particular node from a deepest leaf node in the sub-DAG.

Figure 5A:
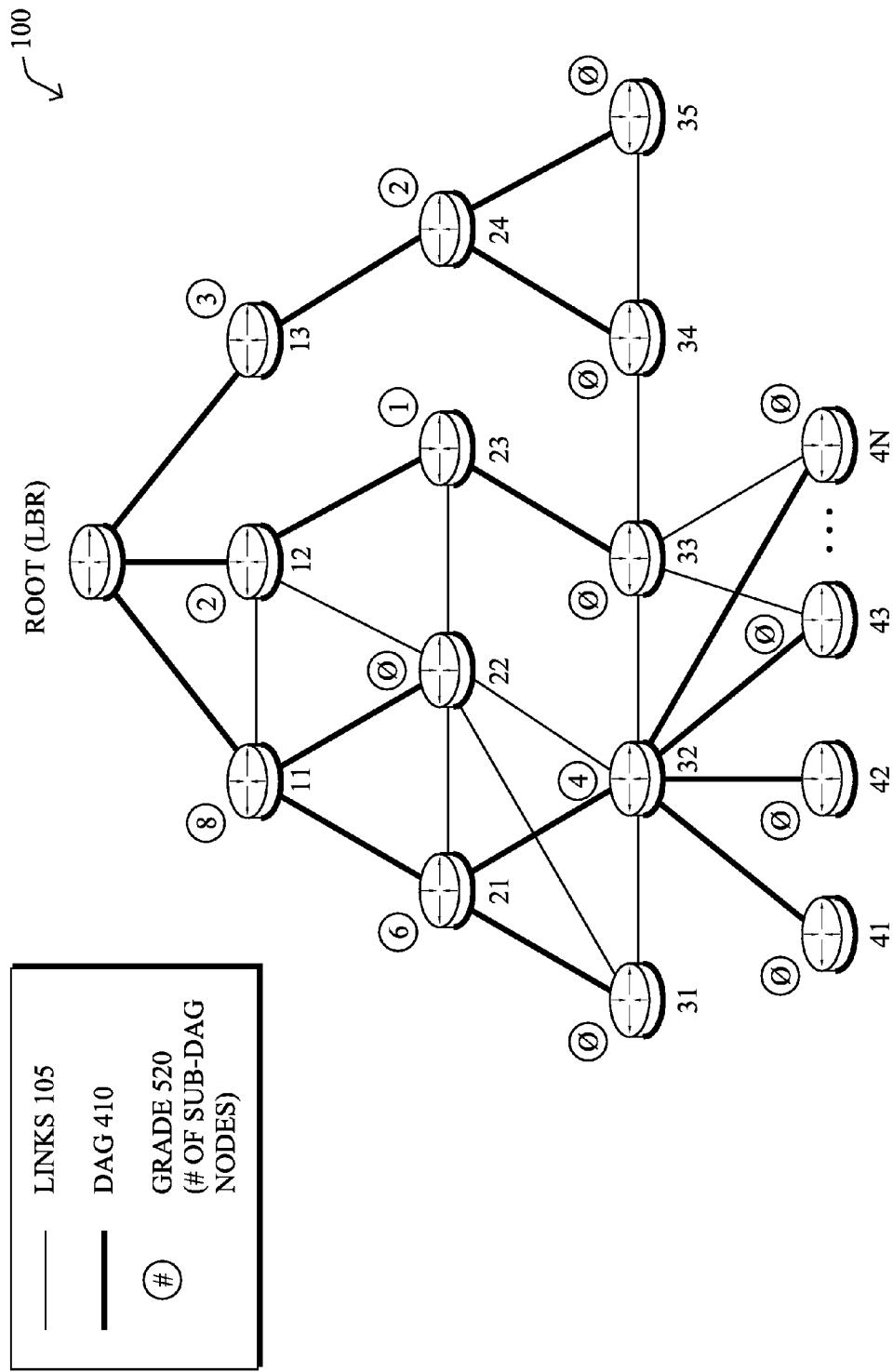
FIGS. 5A-C illustrate example DAG node grading.
Figure 5B:
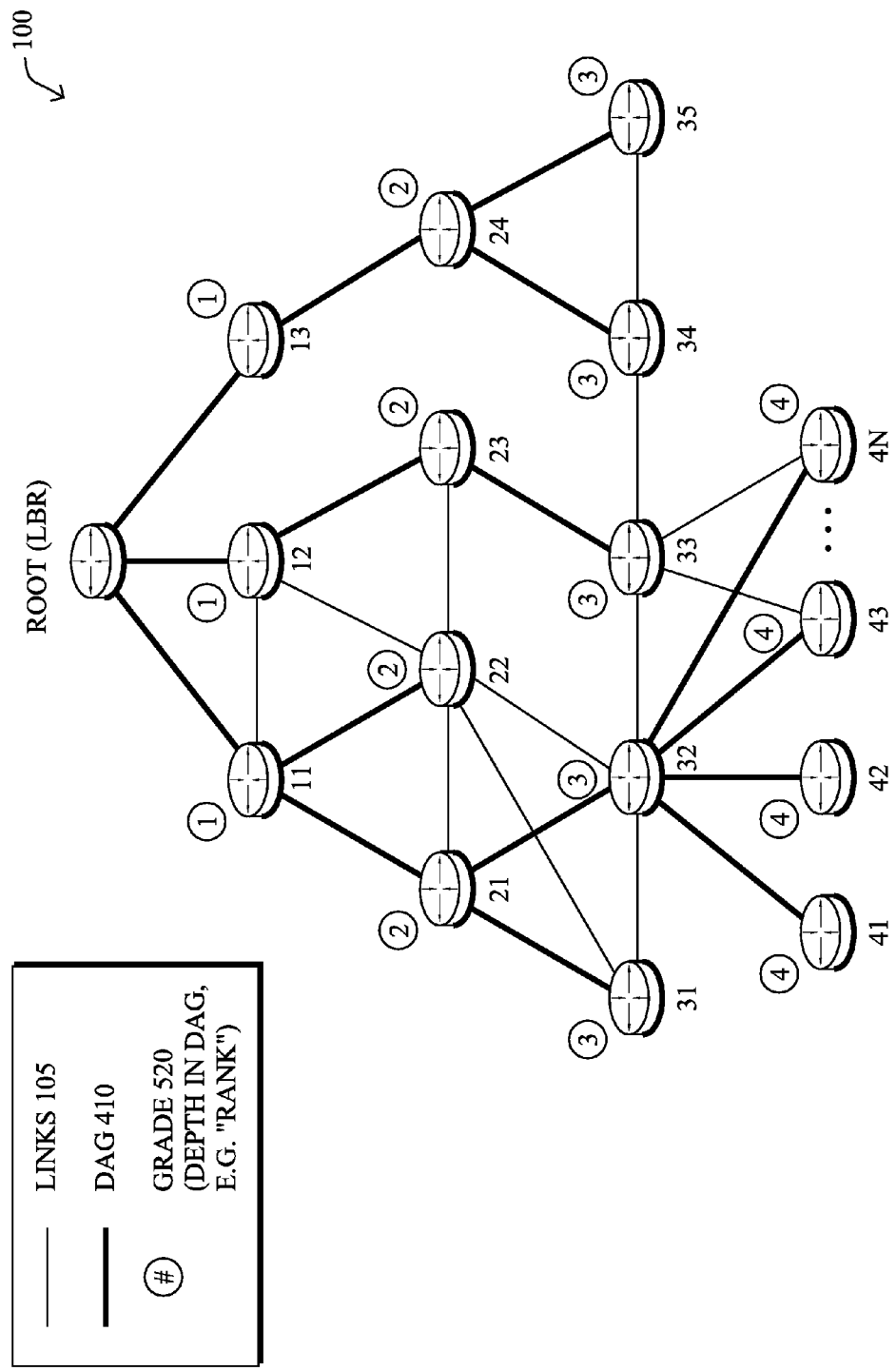
Figure 5C:
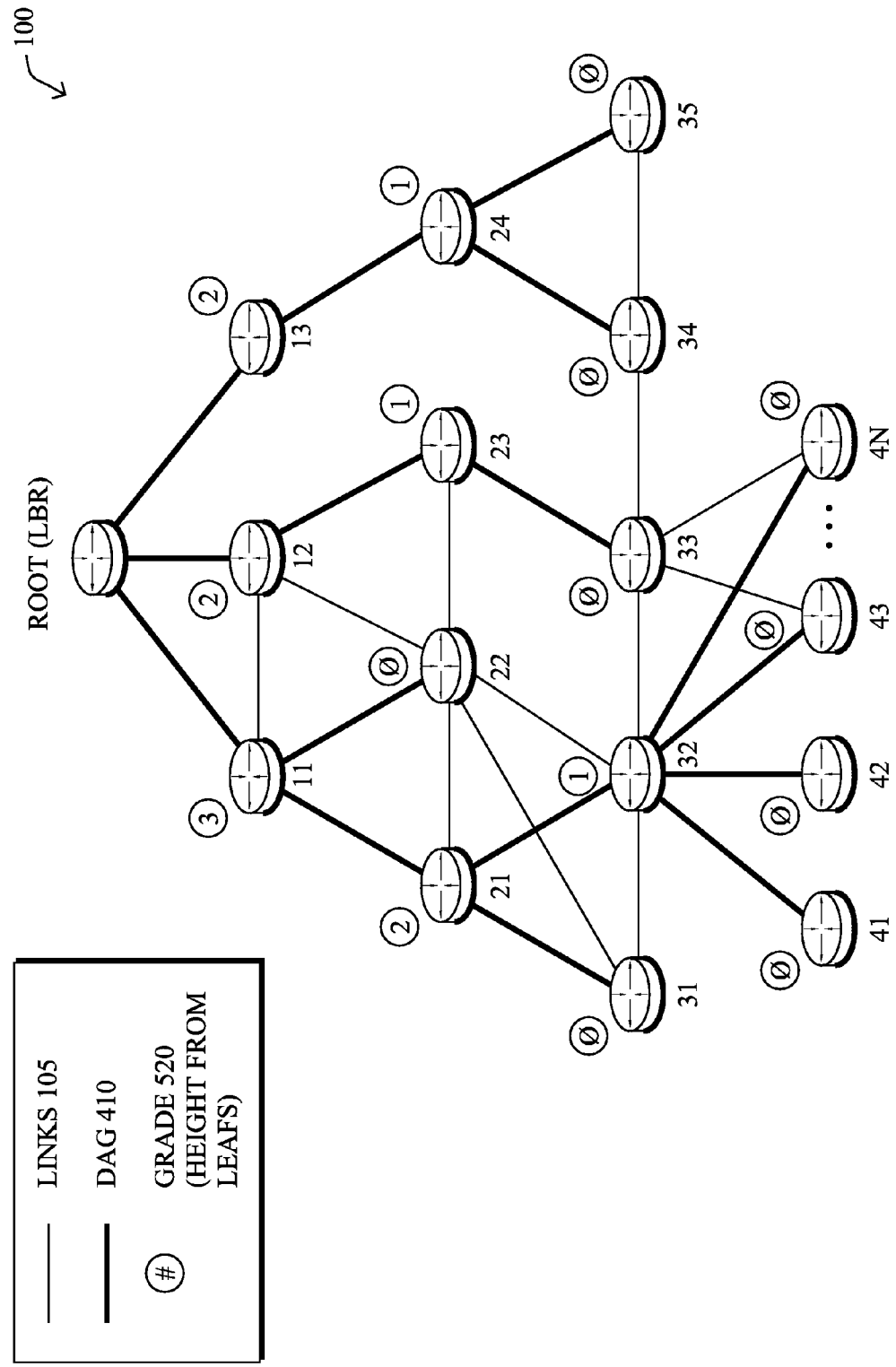

FIGS. 5A-C illustrate these factors in the example DAG topology of FIG. 4. In particular, FIG. 5A illustrates a grade 520 calculated based on a number of sub-DAG nodes for each particular node. For example, leaf nodes (41, 42, 43, 4N, 31, 33, 34, 35, and 22) all have zero (0) nodes in a sub-DAG, as they are at the bottom of their respective DAG branches. In this instance, the "0" is the lowest grade. The highest graded node in FIG. 5A is node 11, with a grade of "8" (i.e., there are eight nodes in its sub-DAG: nodes 21, 22, 31, 32, 41, 42, 43, and 4N). Note that the root node need not be graded, as it generally does not participate in DAG parent selection (it is the highest node, and thus has no parents). Generally, a node may discover the number of nodes in its sub-DAG through DAG messages 300 as discussed above.

In an alternative embodiment, FIG. 5B illustrates a simple grading system, where grades are based on the depth (called "rank" in RPL) of nodes in the DAG 410, that is, a distance from the root node, illustratively known to the devices based on the topology building protocol as will be understood by those skilled in the art. For example, nodes 41-4N have a grade (rank) of "4", nodes 31-35 have a grade (rank) of "3", nodes 21-24 have a grade (rank) of "2", and nodes 11-13 have a grade (rank) of "1". In this instance, the lower numbers (ranks) actually indicate a higher grade, and thus higher numbers (ranks) correspond to a lower grade.

In a further embodiment, as shown in FIG. 5C, the grading may be based instead on the "height" of a node, which, as defined herein, is the distance of the node from a lowest leaf within its sub-DAG. For instance, leaf nodes are again graded "0" (the lowest grade in this embodiment), and any parent node of the leaf nodes are graded "1" (the second lowest). Each successive parent is then graded one higher grade (e.g., node 21 is grade "2", node 11 is grade "3", etc.). Note that leaf node 22 is graded "0", while its parent node 11 is graded "3" and not "1". As can be seen, this is due to the fact that node 11 height based on the furthest leaf node is "3".

Notably, the embodiments as shown in FIGS. 5A-C are based directly on the physical topology of the DAG 410. Inferentially, however, by basing the grades 520 on the topology, the grades are also based on the traffic within the network. For instance, assuming that the nodes on average each produce the same amount of traffic, the more children there are in sub-DAG, the closer a node is to the root node, or the further away a node is from a leaf node, the more traffic that node is typically going to handle. As such, the grade determination may be considered to be based on traffic. At the same time, however, in one or more specific embodiments herein, the grading may be based on actual traffic measurements (e.g., network statistics, such as number of packets, bandwidth values, etc.). In particular, the traffic may be expected traffic (e.g., based on the topology and/or other factors, such as planned use of particular nodes versus other nodes), as well as current or average traffic at each node in the topology.

According to one or more embodiments herein, nodes may detect a trigger for a routing change based on one or more identified routing metric changes in a generally conventional manner. Specifically, in response to a network event resulting in an increased or decreased cost, delay, ETX, etc., that crosses some configured threshold, routing change (convergence, reroute, etc.) may be triggered by the nodes in the network. In certain embodiments herein, however, the thresholds, too, may be based on a node's grade.

Figure 6:
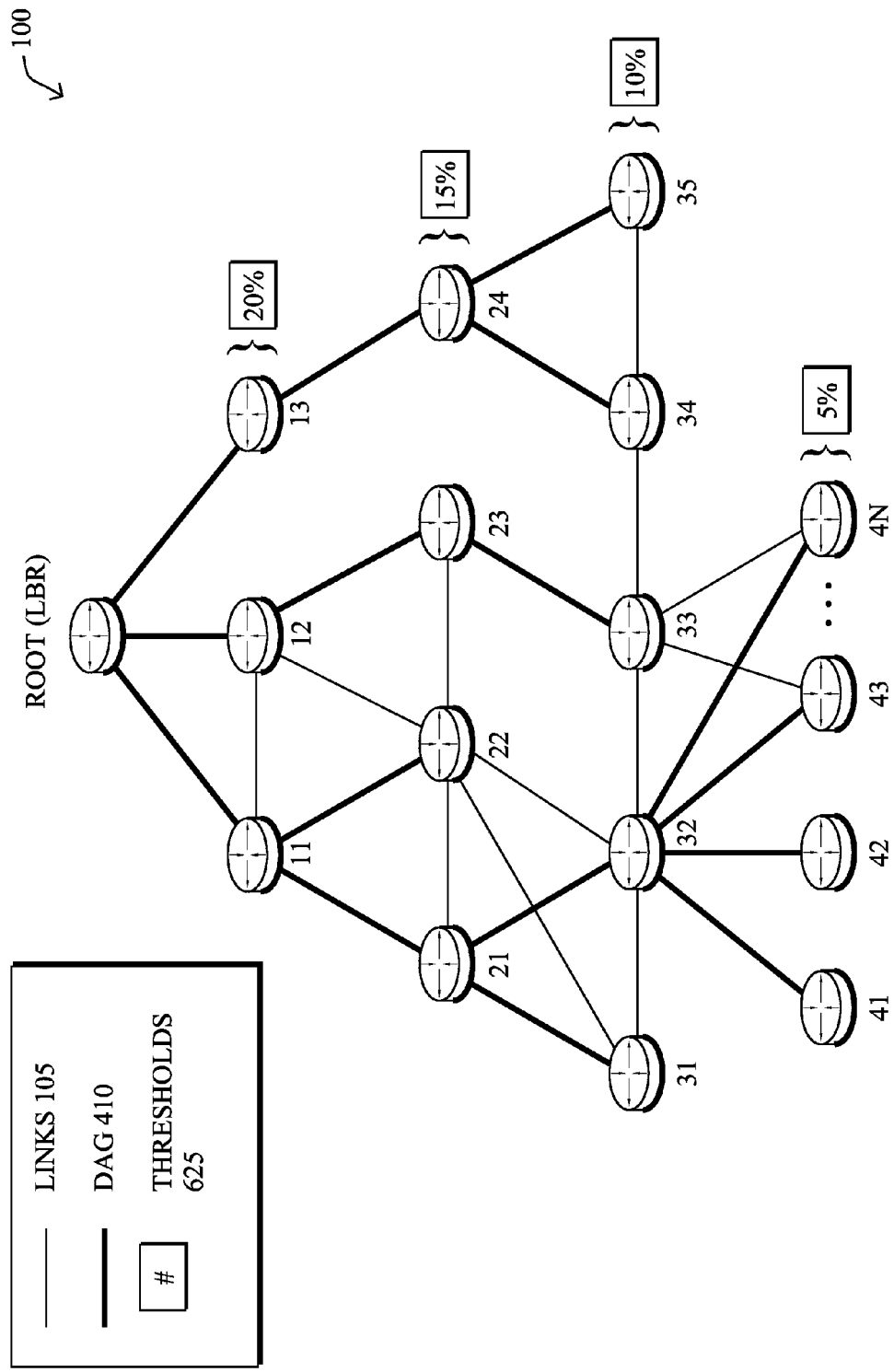
FIG. 6 illustrates an example of DAG node graded thresholds.

FIG. 6 illustrates an example of thresholds 625 that may be based on grade, for example based on the simple DAG-depth-based grades of FIG. 5B above. Illustratively, the lowest graded nodes may have a lower threshold (e.g., 5%), while increasingly graded nodes have correspondingly increasing thresholds 625 (e.g., 10%, 15%, and 20%). Specifically, in these certain embodiments, thresholds are based on the grade such that the threshold for each particular node is greater than or equal to an associated threshold of any of its child nodes, and less than or equal to a second associated threshold of its parent node. In this manner, routing changes may be triggered even less often at higher-graded nodes, thus reducing network changes (or at least slowing them down) nearer to the root node. Notably, the values shown for thresholds 625 are merely examples, and are not meant to limit the scope of the embodiments herein.

Figure 7:
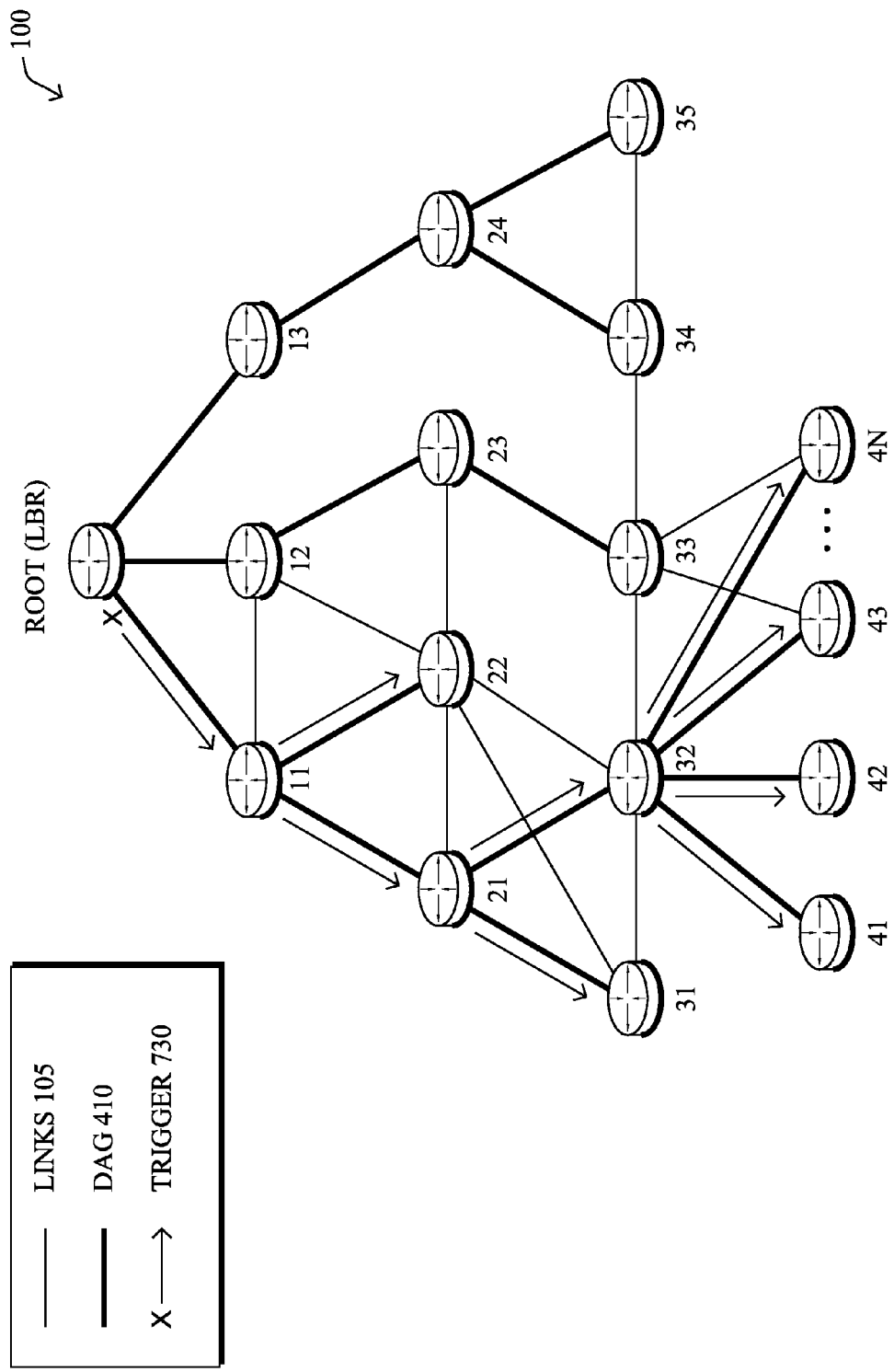
FIG. 7 illustrates an example reroute trigger.

As shown in FIG. 7, a trigger 730 may be detected within the network that indicates a routing change in the DAG. For instance, the trigger may be determined based on identifying a routing metric change at location "X" of a metric selected from cost; delay; latency; available bandwidth; utilized bandwidth; estimated transmission count (ETX), etc. Again, while this change threshold may be shared at all nodes in the network (e.g., anything greater than a 10% change produces a trigger), each node in certain embodiments has a threshold 625 that is based on the grade 520. For example, assume that the ETX value has increased by 15% at this location. Since this value affects all nodes within the particular sub-DAG (of node 11), it is propagated to all of the nodes within that branch/sub-DAG, e.g., in the form of an increased ETX advertised along the path. Each node within the sub-DAG would then receive the changed routing metric, and may each detect the trigger 730. (In one or more embodiments, the trigger is based on an administrator command, a periodic timer, network congestion detection, etc., and as such may be network-wide, and not simply limited to a particular sub-DAG.)

In accordance with the embodiments herein, in response to detecting the trigger 730, each detecting node delays its corresponding routing change based on its respective grade. Specifically, this delay is such that the delay of a particular node is longer than an associated delay of any of its child nodes (if any exist), and yet shorter than an associated delay of the node's parent node. Accordingly, this scheduling updates the network (e.g., parent selection) from the edge of the network (leaf nodes) to the center (root node) based on the dynamic delays/timers, since each node waits for its children (if any) to complete its task before its parent (which, notably, is waiting for its children, etc.). Note that there is no need for any particular node to be actually aware of the delays associated with the children or parent, since it has computed its own delay in the same manner as the other nodes, and as such, the result is that the delay falls between the child nodes' and the parent node's. It should also be noted that while trigger 730 may generally invoke changes in numerous layers of the DAG topology, by starting at the leaf nodes of the network, these changes may often be limited to only a few lower layers of the sub-DAG. In particular, the changes at the periphery of the sub-DAG may optimize the Objective Function (OF) and eliminate the need for DAG changes at the higher layers closer to the DAG root.

Figure 8A:
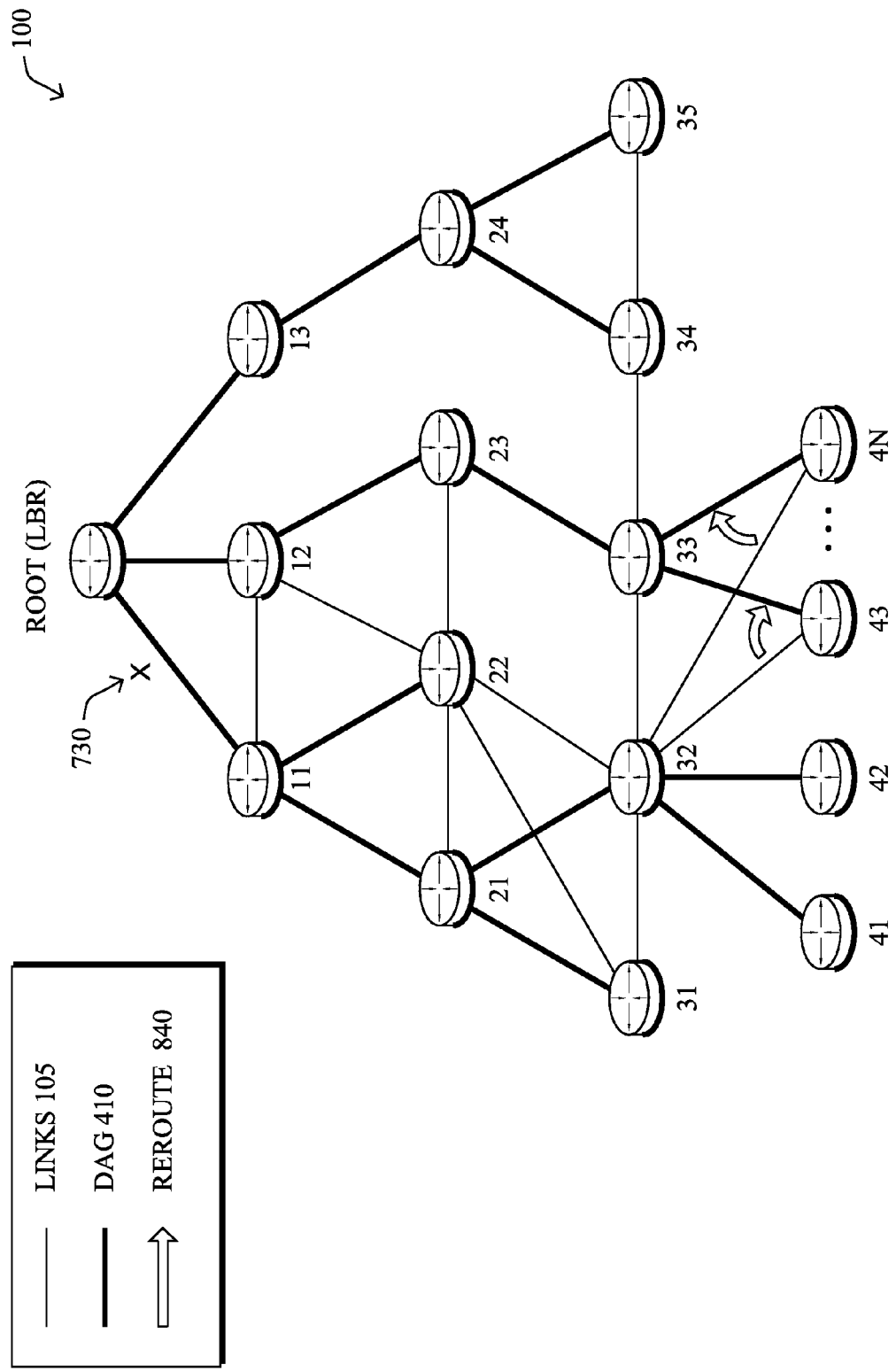
FIGS. 8A-E illustrate an example reroute scheduling.

FIGS. 8A-E illustrate an example reroute scheduling in accordance with one or more embodiments herein. For instance, as shown in FIG. 8A, the rerouting based on the is detected trigger 730 occurs from the edge of the DAG toward the root, thus the first nodes to change their route may be the leaf nodes (e.g., nodes 43 and 4N performing a reroute 840 as shown to select new DAG parents, illustratively node 33). In particular, though all of the nodes within the sub-DAG detect the trigger 730, each node delays its reaction to the trigger based on their respective grade, e.g., the higher the grade, the longer the node waits to perform any routing change. Note that the delay associated with leaf nodes may be no delay (a delay of zero).

In accordance with yet another specific embodiment herein, when a child node updates its route, the timer/delay of the previous parent gets reset. For example, as part of the reset, the parent's timer and those of the parent's parents, may be reset (or, e.g., stopped) pending a new calculation of a new trigger-related measurement (e.g., in this example, a new ETX), notably since the traffic at the old parent node will have changed since the child node(s) (e.g., nodes 43 and 4N) have migrated elsewhere. In one embodiment, the child node may inform its previous parent that is has changed parents (and taken all of its children/sub-DAG) in order for the previous parent to be aware (quickly) that the child has migrated. In other embodiments, other techniques for determining that the child has left may be used, such as routing adjacencies, keepalives, etc., and in response the delay required before performing a routing change (reroute) may be reset, accordingly. It should be noted, again, that in some cases the DAG changes at the lower grades may suffice to alleviate the issue at location X which triggered the reroute event 840, and therefore no further DAG topology changes would be needed.

Figure 8B:
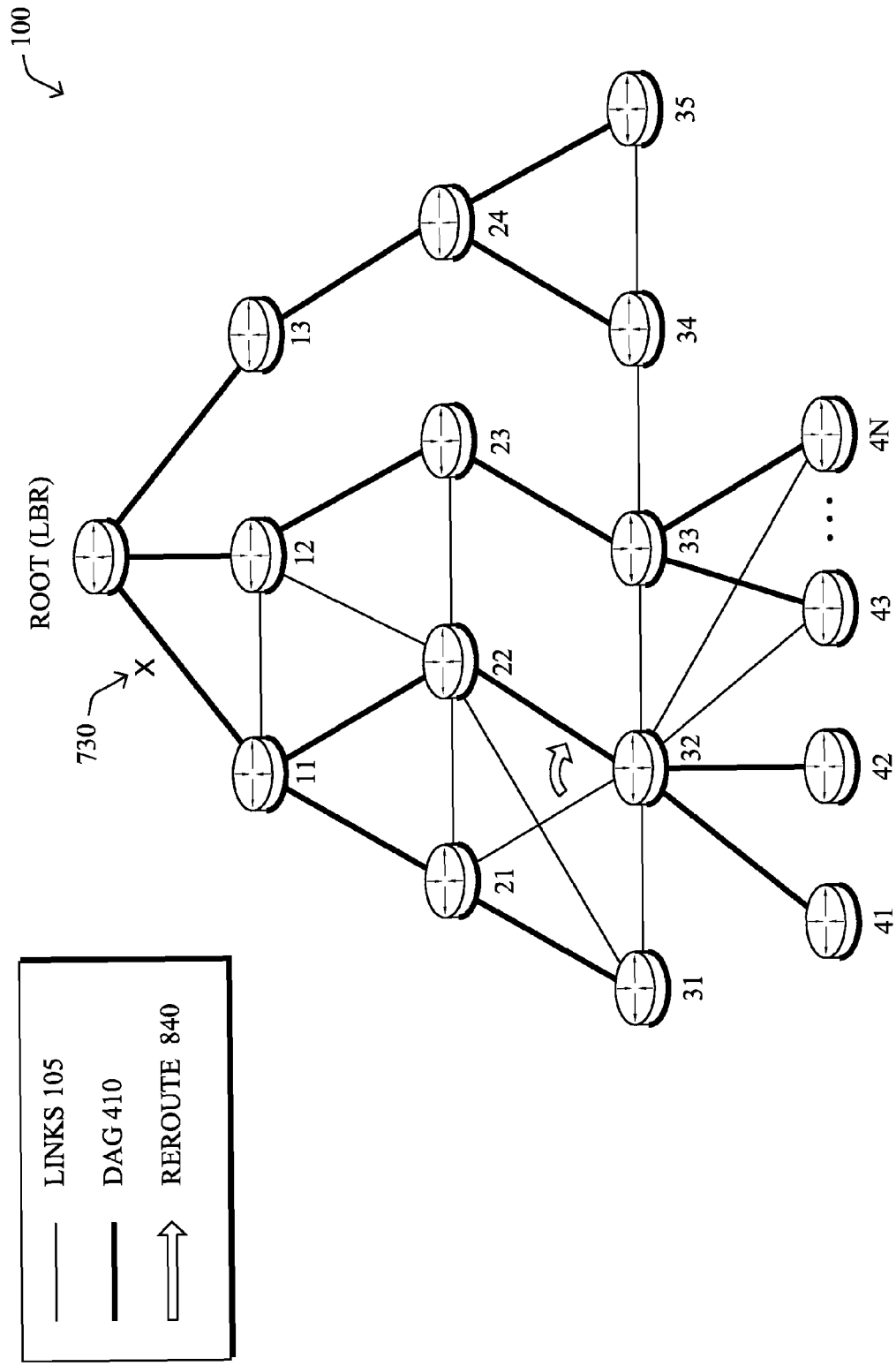

FIG. 8B illustrates a subsequently scheduled routing change, where once the lowest graded leaf nodes have completed their routing changes, or, more particularly, have been given the chance to change routes based on the timer/delay of the next-lowest graded nodes, then those next-lowest graded nodes may perform their routing changes, if the issue in location X has not been resolved. (For illustration, assume that the grading in FIGS. 8A-E is based on DAG depth, as shown in FIG. 5B.) For example, node 32 may determine that despite nodes 43 and 4N selecting a new parent, the network event causing the trigger 730 still requires a parental change at node 32 to select new parent node 22. For instance, it can be assumed that the links from node 32 to node 21 to node 11 is a worse path than that from node 32 to node 22 to node 11 based on the new DAG topology (nodes 43 and 4N leaving node 32). For example, perhaps the link from node 32 to 21 was a higher bandwidth link to support the larger traffic from all of node 32's child nodes, but now that this load is reduced, node 32 can utilize a lower cost link to node 22, etc. As such, node 32 may select the new parent node 22 once node 32's route change delay has expired. Again, as noted above, there may be circumstances where the parent node 32 may not need to select a new parent based on the ordered rerouting sequence herein, although it would have done so in conventional techniques, since the sub-DAG of the parent node may have rerouted in a manner that alleviates the need of the parent node to do so itself.

Figure 8C:
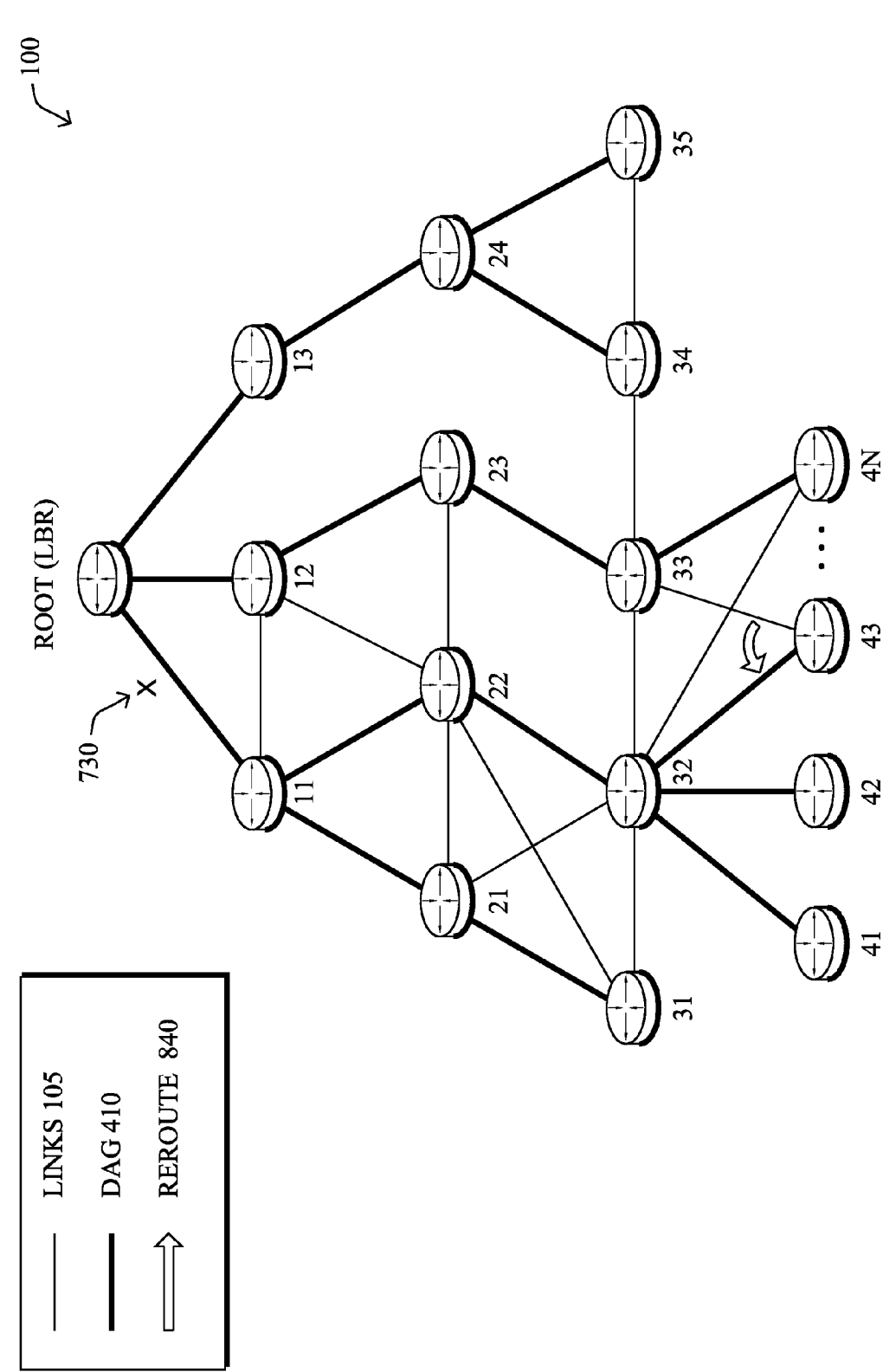

Now that node 32 has been given the chance to reroute (e.g., select a new parent), the scheduled delays may propagate up the grades to a next higher graded node, however in one or more embodiments herein, the scheduled delay returns to the lower graded nodes, as shown in FIG. 8C. For instance, as shown, based on the change of node 32 to select new parent node 22, perhaps node 43 would like to change back to node 32. Due to the resetting of the delay timers at node 32 after making the change, and node 22 (and node 11) after hearing of node 32's change, the delay restarts to allow the edge of the DAG 410 to resettle on a new parent if so desired, before creating routing changes closer to the root/center of the network.

Figure 8D:
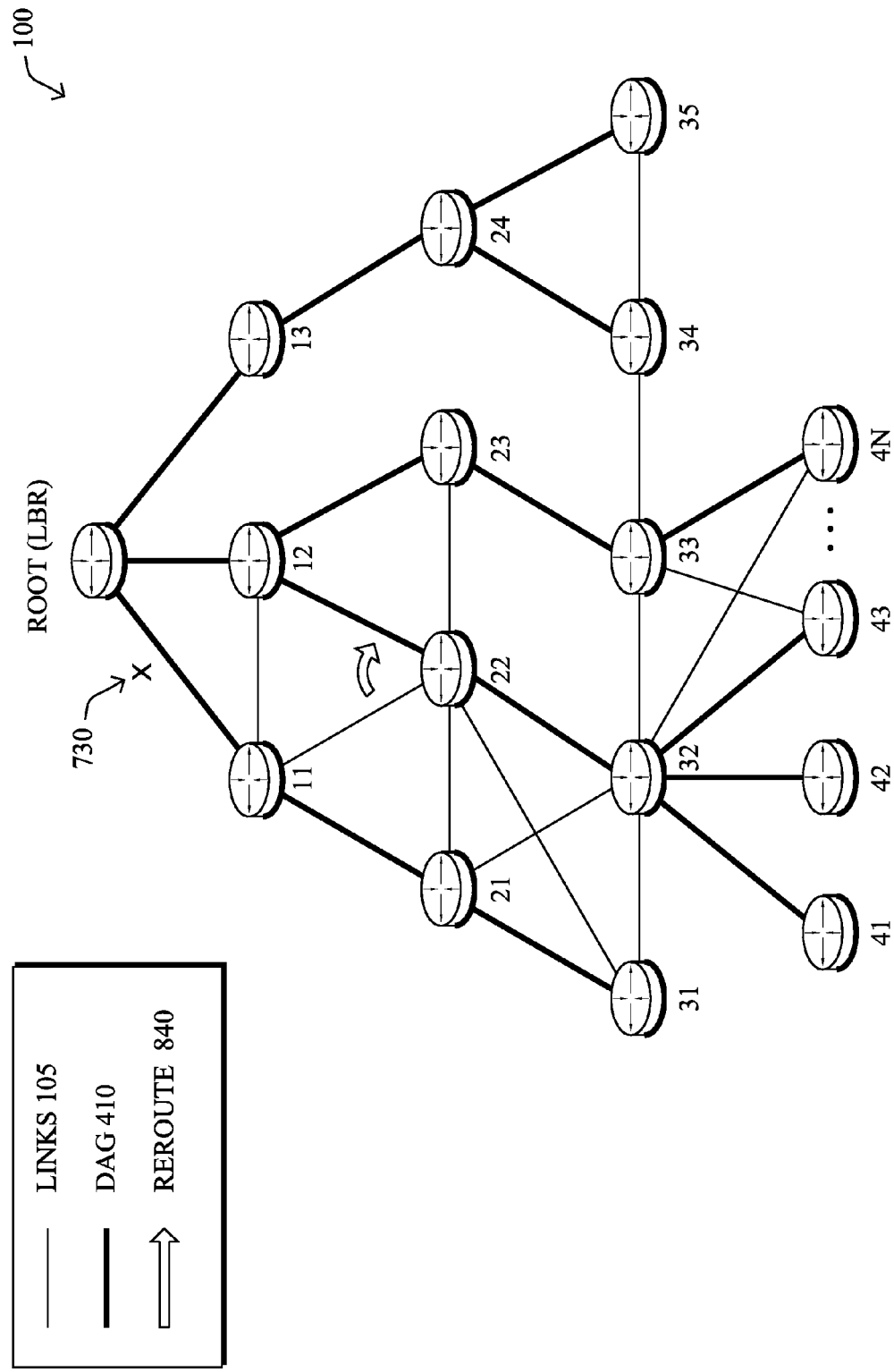

Once again, the schedule may pass to the next nodes, and eventually, as shown in FIG. 8D, a change closer to the DAG root (mesh/cell center) occurs at node 22, which, if still needed, is given the chance to adjust its route based on the detected trigger 730, and now, according to the techniques herein, based on the changes that have been allowed to occur below node 22. For instance, though node 22 is shown changing parents to node 12, based on node 4N's migration to node 33, it may be possible that node 22 need not have changed parents in response to the triggered event/change 730. For instance, as mentioned above, while in conventional techniques node 22 would change parents in response to the trigger 730 without regard to what its sub-DAG was doing, affecting a potentially large amount of nodes in the network (its sub-DAG), node 22 according to the techniques herein would wait for node 4N (and any other nodes) to have reacted to the trigger first, according to the scheduled rerouting herein, potentially alleviating node 22's reasons for selecting a new parent.

Specifically, as each node in the scheduled reroute is given its turn to change routes, these nodes determine whether the trigger is still valid, i.e., does the condition indicating the need to change still exist, or has the condition already been resolved by the lower graded nodes' topology modifications (e.g., based on child nodes having already changed parents, and thus based on the resultant redirection of traffic within the network).

Figure 8E:
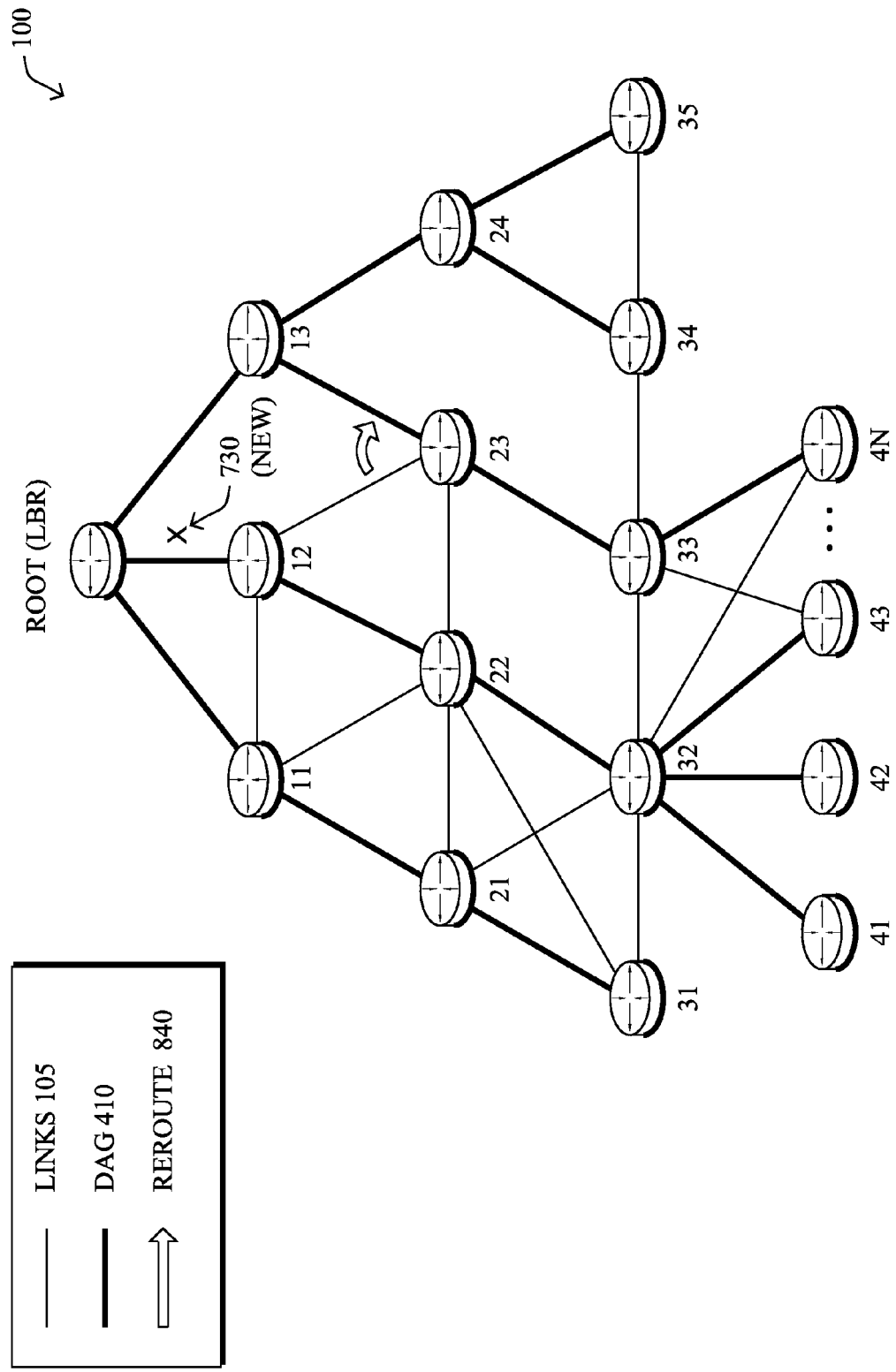

Note that the result of rerouting in response to a detected trigger within one particular branch/sub-DAG may result in one or more additional detected triggers within the network. For example, as shown in FIG. 8E, the reroute of node 22 to new parent node 12 may result in deterioration of the link between node 12 and the root node to the point that, eventually, node 23 reroutes to select parent node 13 upon a new trigger 730 (e.g., in due course based on the delays/timers described above).

Figure 9A:
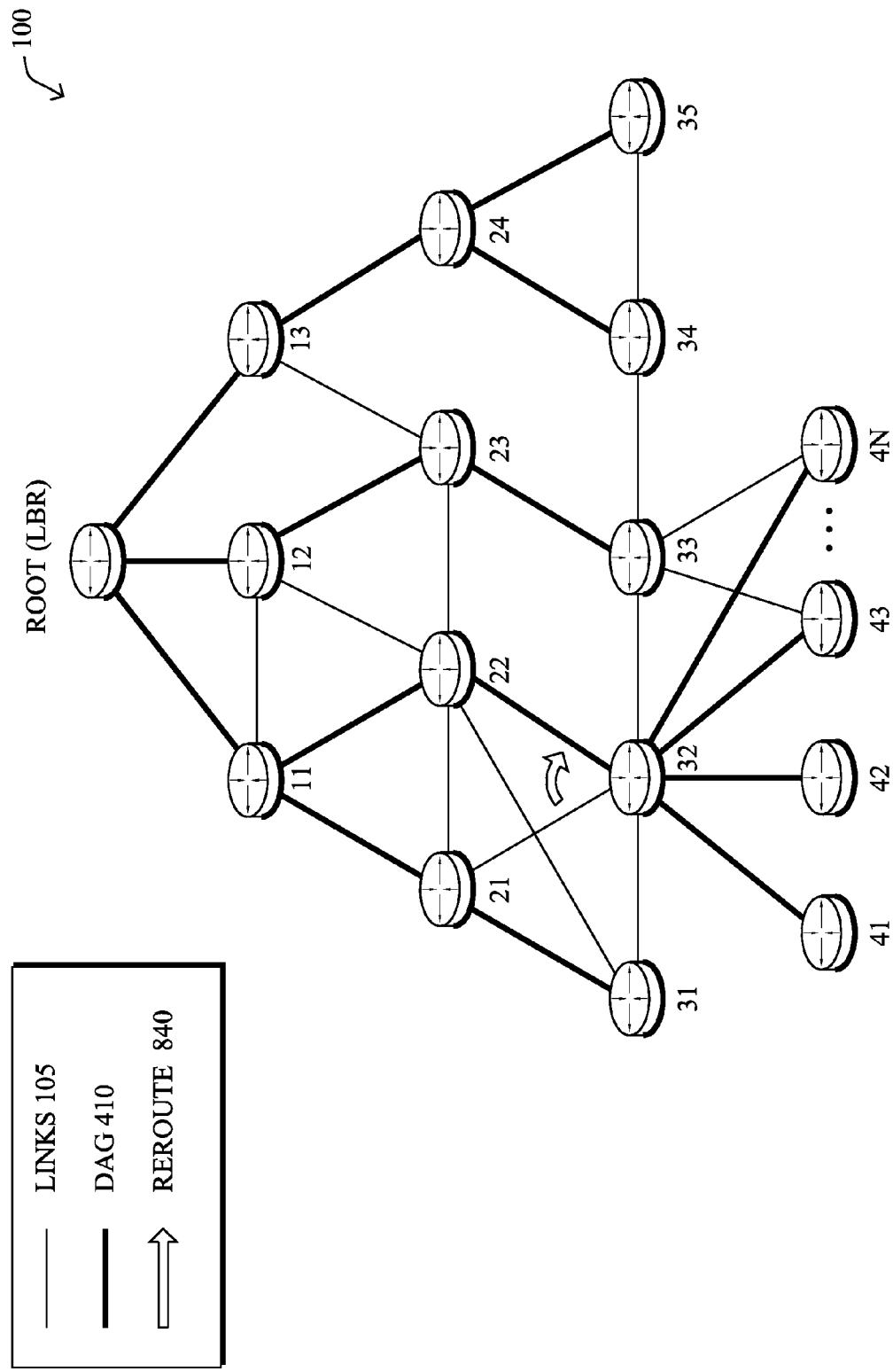
FIGS. 9A-B illustrate an example of parallel reroute scheduling.
Figure 9B:
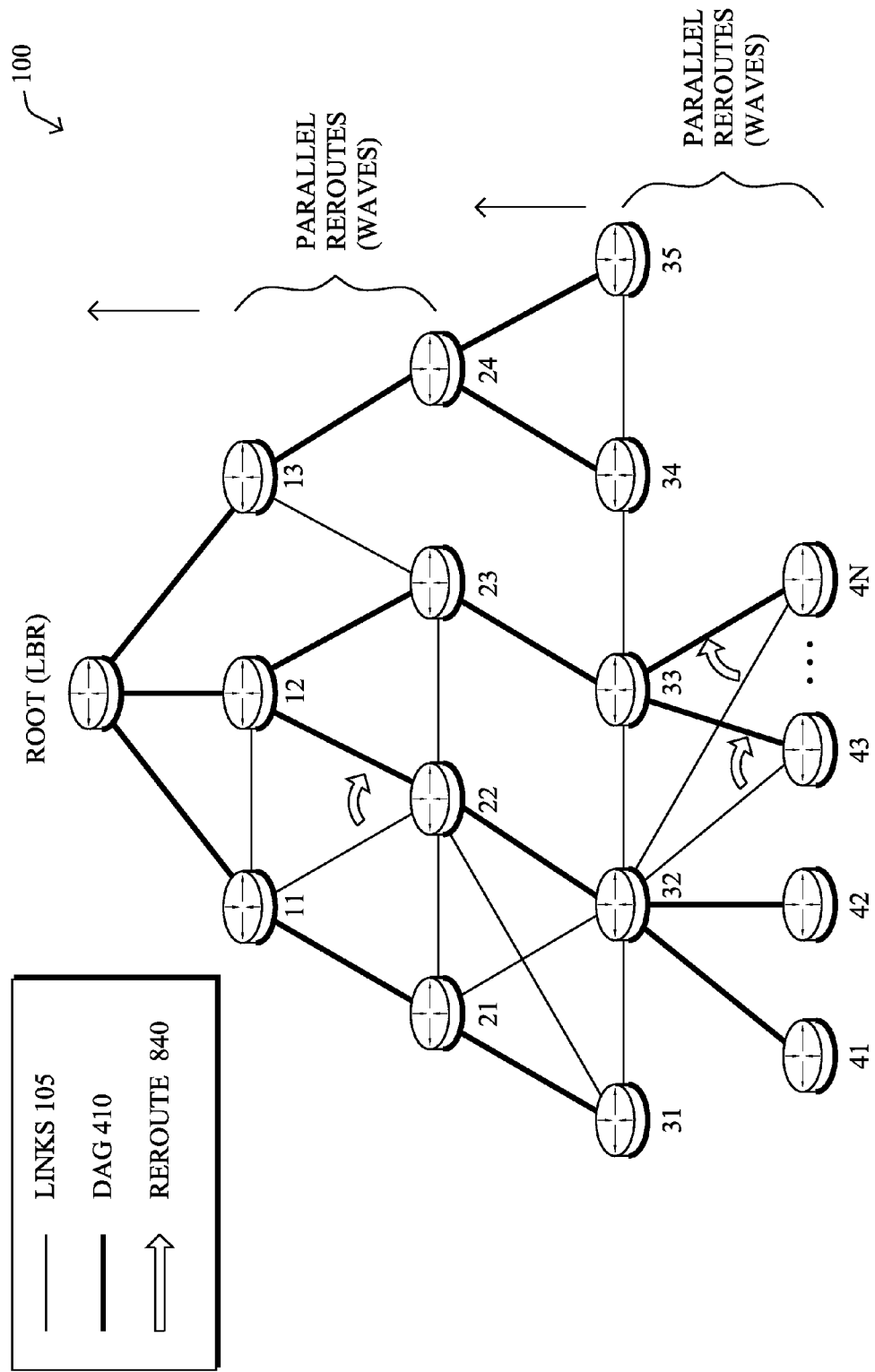

In accordance with yet another embodiment, changes may occur in parallel in multiple layers (e.g., distance from the root). For instance, as shown in FIG. 9A, assume that in an unrelated change to FIGS. 8A-E above, node 32 changes parents from node 21 to node 22 in a particular scheduled instance of rerouting. While this change propagates based on the delay described above, a newly started rerouting may take place from the edge again. For example, as shown now in FIG. 9B, while the first "wave" of reroutes is propagating from node 32 to node 22 (which may reroute from node 11 to node 12 based on receiving the new traffic from node 32), a second new wave may begin at the leave nodes 43 and 4N, e.g., in response to perhaps an increased cost resulting from node 32's previous change. (Though DAG 410 is a simplified illustration, the concept of propagating parallel waves through the DAG may still be appreciated.)

Figure 10:
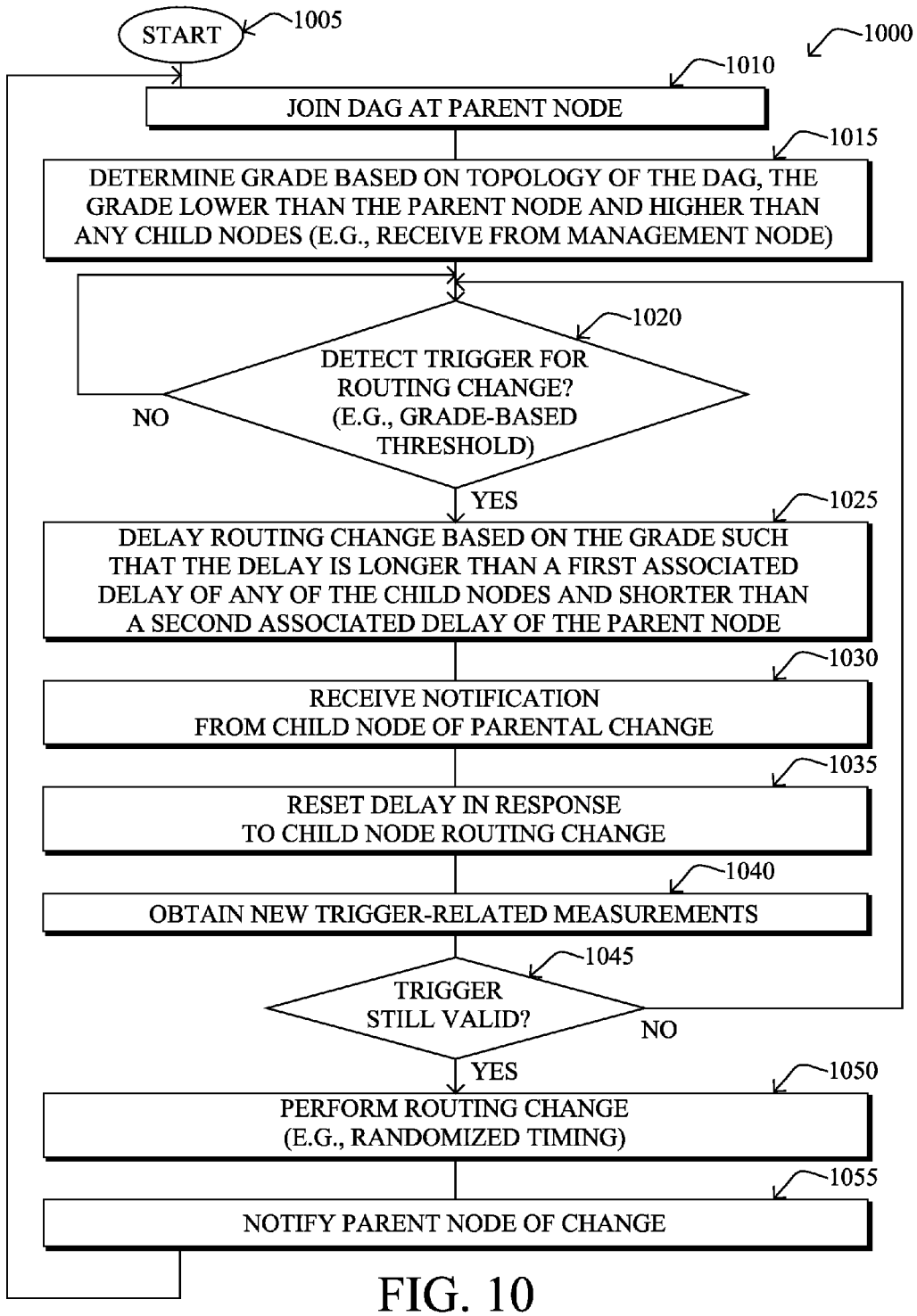
FIG. 10 illustrates an example simplified procedure for dynamic reroute scheduling.

In closing, FIG. 10 illustrates an example simplified procedure for dynamically adjusting reroute ordering/timing in a DAG in accordance with one or more embodiments described herein. The procedure 1000 starts at step 1005, and continues to step 1010, where a particular node 200 joins a DAG 410 at a parent node, and then in step 1015 determines its grade based on the topology of the DAG, where the grade is lower than that of the parent node and higher than that of any child nodes. In one embodiment, the grade is received from management node (e.g., root node) of the DAG, though in other embodiments, the particular node computes the grade for itself.

In response to detecting a trigger 730 for a routing change in step 1020 as described in detail above (e.g., based on graded thresholds), the particular node, assuming not at the lowest grade (e.g., a leaf node), delays its own routing change based on the grade in step 1025. As explained in detail above, the delay is longer than a first associated delay of any of the child nodes and shorter than a second associated delay of the parent node. In other words, the particular node allows time for any child nodes to make routing changes in response to the trigger, and then would similarly perform any changes itself before its parent node.

Optionally, as noted above, in step 1030 the particular node may receive notifications from child nodes about their respective parental changes, if any, and in response to determining the child node's change may reset the delay in step 1035, e.g., to allow further changes during a revisit to step 1025.

During the delay, and illustratively based on any sub-DAG routing changes during the delay, the particular node obtains new trigger-related measurements in step 1040, such as new ETX measurements, new cost, etc. If the trigger is no longer valid based on the new measurements in step 1045, then the procedure returns to step 1020 to await detection of a future trigger. On the other hand, if the trigger is still valid after the expiration of the delay in step 1045, then in step 1050 the particular node may perform its routing change during its scheduled (ordered) time. As mentioned above, the routing change may be randomized further within the scheduled time to allow same-grade nodes to adjust at slightly different times in hopes of alleviating oscillations or collisions.

After optionally notifying the previous parent node of the routing (parental) change in step 1055 (certain embodiments), then the procedure 1000 returns to step 1010 to join the DAG at a new parent, determines a new grade accordingly in step 1015, and awaits further reroute triggers 730 in step 1020. Notably, these new triggers may be based on the changes made in response to the previous trigger, as pointed out above (e.g., with reference to FIG. 8C). It should also be noted that while certain steps within procedure 1000 may be optional as described above, the steps in FIG. 10 are merely an example for illustration, and certain steps may be included or excluded as desired.

The novel techniques described herein, therefore, provide for dynamically adjusting reroute ordering/timing in a computer network. In particular, the novel techniques ensure that route changes are being started from the edge of the network/mesh (leafs), and due to this ordered scheduling, the number of reroutes in the network may be reduced since parent selections (reroutes) may be cancelled because of reroutes in a node's sub-DAG that have taken place before any decision to reroute at the node's own grade (e.g., rank). Consequently route flapping close to the root is minimized and as such the impact to major traffic flows is mitigated (e.g., improving the measurement metrics of the mesh cell). In addition, operating according to the one or more embodiments herein reduces the number of lost messages by minimizing the number of large route flaps, for instance, by performing rerouting in a semi-coordinated manner starting from the edge of the network and moving towards the center of the network, which results in a more damped network convergence.

Further, the adaptive (dynamic) techniques above provide functionality that would be difficult, if not practically impossible, to perform manually, particularly for networks with a large number of nodes. That is, RPL has been designed to provide a high degree of flexibility thanks to the central decision of a number of RPL parameters by, e.g., the DAG root. The downside effect of this, however, is that a network administrator has to configure a large set of timers and variables, which may be a cumbersome task and fairly difficult since the network characteristics may greatly vary with the environment (smart cities, smart grids, homes, etc.). Accordingly, the novel techniques herein provide adaptive adjustment of the routing update ordering (e.g., delay and thresholds) according to the topology (e.g., and traffic metrics) of the particular network.

While there have been shown and described illustrative embodiments that dynamically adjust reroute ordering/timing in a computer network, it is to be understood that various other adaptations and modifications may be made within the spirit and scope of the embodiments herein. For example, the embodiments have been shown and described herein with relation to LLNs, and more particular, to the RPL protocol. However, the embodiments in their broader sense are not as limited, and may, in fact, be used with other types of networks and/or protocols utilizing DAG routing (e.g., distance vector protocols).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   joining, by a particular node, a directed acyclic graph (DAG) in a computer network at a parent node;
   determining a grade of the particular node based on a topology of the DAG, the grade of the particular node being lower than a grade of the parent node and higher than grades of child nodes of the particular node, wherein nodes with a larger number of children have a higher grade than nodes with fewer children;
   detecting a trigger for a routing change in the DAG;
   in response to detecting the trigger, delaying the routing change by the particular node based on the grade of the particular node, wherein the higher the grade, the longer the particular node waits to perform any routing change;
   in response to expiration of the delay, determining if the trigger for the routing change is still valid based on changes that have occurred during the delay to the particular node; and
   if valid, performing the routing change by the particular node,
   wherein the delay is longer than a first associated delay of at least some of the child nodes and shorter than a second associated delay of the parent node.

2. The method as in claim 1, wherein the determining the grade of the particular node comprises:
   determining the grade of the particular node based on topology factors of the DAG selected from a group consisting of: a number of nodes in a sub-DAG of the particular node; a depth of the particular node within the DAG from a root node; and a height in the sub-DAG of the particular node from a deepest leaf node in the sub-DAG.

3. The method as in claim 1, wherein the determining the grade of the particular node comprises:
   determining the grade of the particular node based on topology factors of the DAG selected from a group consisting of: traffic expected at the particular node based on the topology; current traffic at the particular node due to the topology; and an average traffic at the particular node based on the topology.

4. The method as in claim 1, wherein the detecting the trigger comprises:
   identifying a routing metric change of a metric selected from a group consisting of: cost; delay; latency; available bandwidth; utilized bandwidth; and estimated transmission count (ETX).

5. The method as in claim 1, wherein the detecting the trigger comprises:
   identifying a routing metric change that is greater than a threshold, the threshold based on the grade such that the threshold is greater than or equal to a first associated threshold of the at least some of the child nodes and less than or equal to a second associated threshold of the parent node.

6. The method as in claim 1, further comprising:
   receiving the grade at the particular node from a management node of the DAG.

7. The method as in claim 1, further comprising:
   receiving a notification from a particular one of the child nodes that the particular child node is changing parents to a node other than the particular node; and
   in response to receiving the notification, determining if the trigger is still valid based on the child node changing parents.

8. The method as in claim 1, further comprising:
   transmitting a notification from the particular node to the parent node that the particular node is changing parents to a node other than the parent node.

9. The method as in claim 1, wherein the determining if the trigger is still valid comprises:
   waiting for new measurements based on any route changes performed by one or more child nodes of the particular node;
   analyzing the new measurements;
   determining that the trigger is still valid if new measurements merit route changes by the particular node.

10. The method as in claim 1, further comprising:
    determining that one of the child nodes changed parents to a node other than the particular node; and
    in response to determining that one of the child nodes changed parents, resetting the delay to the routing change.

11. The method as in claim 1, further comprising:
    randomizing the performance of the routing change within a range that is longer than the first associated delay of the at least some of the child nodes and shorter than the second associated delay of the parent node.

12. The method of claim 1 wherein the determining the grade of the device based on the topology of the DAG, includes determining the grade of the device to be higher than any of the child nodes.

13. An apparatus, comprising:
    one or more network interfaces configured to participate in a directed acyclic graph (DAG) in a computer network;
    a processor coupled to the network interfaces and configured to execute one or more processes; and
    a memory configured to store a process executable by the processor, the process when executed operable to:
    join the DAG at a parent node;
    determine a grade of the apparatus based on a topology of the DAG, the grade of the apparatus being lower than a grade of the parent node and higher than grades of child nodes of the apparatus, wherein nodes with a larger number of children have a higher grade than nodes with fewer children;
    detect a trigger for a routing change in the DAG;
    in response to detecting the trigger, delay the routing change by the apparatus based on the grade of the apparatus, wherein the higher the grade, the longer the apparatus waits to perform any routing change;

in response to expiration of the delay, determine if the trigger for the routing change is still valid based on changes that have occurred during the delay to the apparatus; and if valid, perform the routing change, wherein the delay is longer than a first associated delay of at least some of the child nodes and shorter than a second associated delay of the parent node.

14. The apparatus as in claim 13, wherein the process when executed to determine the grade of the apparatus is operable to:

determine the grade of the apparatus based on topology factors of the DAG selected from a group consisting of: a number of nodes in a sub-DAG of the apparatus; a depth of the apparatus within the DAG from a root node; and a height in the sub-DAG of the apparatus from a deepest leaf node in the sub-DAG.

15. The apparatus as in claim 13, wherein the process when executed to determine the grade of the apparatus is operable to:

determine the grade of the apparatus based on topology factors of the DAG selected from a group consisting of: traffic expected at the apparatus based on the topology; current traffic at the apparatus due to the topology; and an average traffic at the apparatus based on the topology.

16. The apparatus as in claim 13, wherein the process when executed to detect the trigger is operable to:

identify a routing metric change of a metric selected from a group consisting of: cost; delay; latency; available bandwidth; utilized bandwidth; and estimated transmission count (ETX).

17. The apparatus as in claim 13, wherein the process when executed to detect the trigger is operable to:

identify a routing metric change that is greater than a threshold, the threshold based on the grade such that the threshold is greater than or equal to a first associated threshold of the some of the child nodes and less than or equal to a second associated threshold of the parent node.

18. The apparatus as in claim 13, wherein the process when executed is further operable to:

receive the grade of the apparatus from a management node of the DAG.

19. The apparatus as in claim 13, wherein the process when executed is further operable to:

receive a notification from a particular one of the child nodes that the particular child node is changing parents to a node other than the apparatus; and in response to receiving the notification, determine if the trigger is still valid based on the child node changing the parents.

20. The apparatus as in claim 13, wherein the process when executed is further operable to:

transmit a notification to the parent node that the apparatus changed parents to a node other than the parent node in response to the performed routing change.

21. The apparatus as in claim 13, wherein the process when executed to determine if the trigger is still valid is operable to:

wait for new measurements based on any route changes performed by one or more child nodes of the apparatus;
analyze the new measurements;
determine that the trigger is still valid if the new measurements merit route changes by the apparatus.

22. The apparatus as in claim 13, wherein the process when executed is further operable to:

determine that one of the child nodes changed parents to a node other than the apparatus; and in response to determining that one of the child nodes changed parents, reset the delay to the routing change.

23. The apparatus as in claim 13, wherein the process when executed is further operable to:

randomize the performance of the routing change within a range that is longer than the first associated delay of the at least some of the child nodes and shorter than the second associated delay of the parent node.

24. A tangible, non-transitory, computer-readable media having software encoded thereon, the software when executed by a processor on a device operable to:

join a directed acyclic graph (DAG) in a computer network at a parent node;

determine a grade of the device based on a topology of the DAG, the grade of the device being lower than a grade of the parent node and higher than grades of child nodes of the device, wherein nodes with a larger number of children have a higher grade than nodes with fewer children;

detect a trigger for a routing change in the DAG;

in response to detecting the trigger, delay the routing change by the device based on the grade of the device, wherein the higher the grade, the longer the device waits to perform any routing change;

in response to expiration of the delay, determine if the trigger for the routing change is still valid based on changes that have occurred during the delay to the device; and if valid, perform the routing change, wherein the delay is longer than a first associated delay of at least some of the child nodes and shorter than a second associated delay of the parent node.

* * * * *

UNITED STATES PATENT AND TRADEMARK OFFICE
CERTIFICATE OF CORRECTION

PATENT NO. : 8,937,886 B2
APPLICATION NO. : 12/971474
DATED : January 20, 2015
INVENTOR(S) : Shaffer et al.

Page 1 of 1

It is certified that error appears in the above-identified patent and that said Letters Patent is hereby corrected as shown below:

In the Specification

Please amend column 1, line 24 as follows:
    by which each node performs [[is]] DODAG discovery, construc-

Please amend column 3, line 6 as follows:
    tion), certain sensor networks provide [[is]] for mechanisms

Please amend column 3, line 49 as follows:
    Control [[is]] Protocol/Internet Protocol (TCP/IP), User Data-

Please amend column 4, line 67 as follows:
    in the network can tell the [[is]] less capable devices exactly

Please amend column 5, line 39 as follows:
    ing Protocol for Low Power and Lossy [[is]] Networks

Please amend column 6, line 14 as follows:
    specify rules on how to build the DAG (e.g. [[is]] number of

Please amend column 7, line 33 as follows:
    message is then sent [[is]] directly to the DODAG root that can in

Please amend column 11, line 55 as follows:
    instance, as shown in FIG. 8A, the rerouting based on the [[is]]

Signed and Sealed this
Eleventh Day of August, 2015

Michelle K. Lee
*Director of the United States Patent and Trademark Office*